United States Patent
Härle et al.

(10) Patent No.: US 8,073,300 B2
(45) Date of Patent: Dec. 6, 2011

(54) ARRANGEMENT COMPRISING A FIBER-OPTIC WAVEGUIDE

(75) Inventors: Volker Härle, Laaber (DE); Alfred Lell, Maxhütte-Haidhof (DE); Hubert Ott, Bad-Abbach (DE); Norbert Stath, Regensburg (DE); Uwe Strauss, Bad Abbach (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 2 days.

(21) Appl. No.: 12/306,923

(22) PCT Filed: Jun. 15, 2007

(86) PCT No.: PCT/DE2007/001060
§ 371 (c)(1),
(2), (4) Date: Aug. 26, 2009

(87) PCT Pub. No.: WO2008/000222
PCT Pub. Date: Jan. 3, 2008

(65) Prior Publication Data
US 2010/0091516 A1    Apr. 15, 2010

(30) Foreign Application Priority Data
Jun. 26, 2006  (DE) .................. 10 2006 029 204

(51) Int. Cl.
*G02B 6/02* (2006.01)
(52) U.S. Cl. ........ 385/123; 385/124; 385/125; 385/126; 385/127
(58) Field of Classification Search .......... 385/123, 385/124, 125, 126, 127
See application file for complete search history.

(56) References Cited

U.S. PATENT DOCUMENTS

| | | | |
|---|---|---|---|
| 4,298,794 A | 11/1981 | Snitzer et al. | |
| 4,812,641 A | 3/1989 | Ortiz Jr. | |
| 5,729,012 A | 3/1998 | Wood et al. | |
| 6,259,517 B1 | 7/2001 | Tedesco et al. | |
| 6,350,041 B1 | 2/2002 | Tarsa et al. | |
| 6,932,809 B2 | 8/2005 | Sinofsky | |

FOREIGN PATENT DOCUMENTS

| | | |
|---|---|---|
| CN | 1425117 | 6/2003 |
| DE | 10 2004 010 275 | 9/2005 |
| EP | 0 320 108 | 6/1989 |
| EP | 1 795 798 | 9/2005 |
| EP | 1 662 288 | 11/2005 |
| FR | 2 500 638 | 8/1982 |
| GB | 2 077 471 | 12/1981 |
| JP | 59 068702 | 4/1984 |
| JP | 61-34436 | 2/1986 |
| JP | 61 091536 | 5/1986 |
| JP | 2004-151667 A * | 5/2004 |
| WO | WO 2006/038502 | 4/2006 |

OTHER PUBLICATIONS

Römpp Chemielexikon, 9. erweiterte und neu bearbeitete Auflage, George-Thiem-Verlag, Stuttgart.

* cited by examiner

*Primary Examiner* — Jennifer Doan
(74) *Attorney, Agent, or Firm* — Cozen O'Connor

(57) ABSTRACT

An arrangement comprising a fiber-optic waveguide (10) and a detection device (25), wherein the fiber-optic waveguide (10) comprises a core region (10E) and a cladding region (10C) surrounding the core region (10E), wherein the core region has a higher refractive index than the cladding region, and wherein the detection device (25) can detect damage to the fiber-optic waveguide (10).

14 Claims, 9 Drawing Sheets

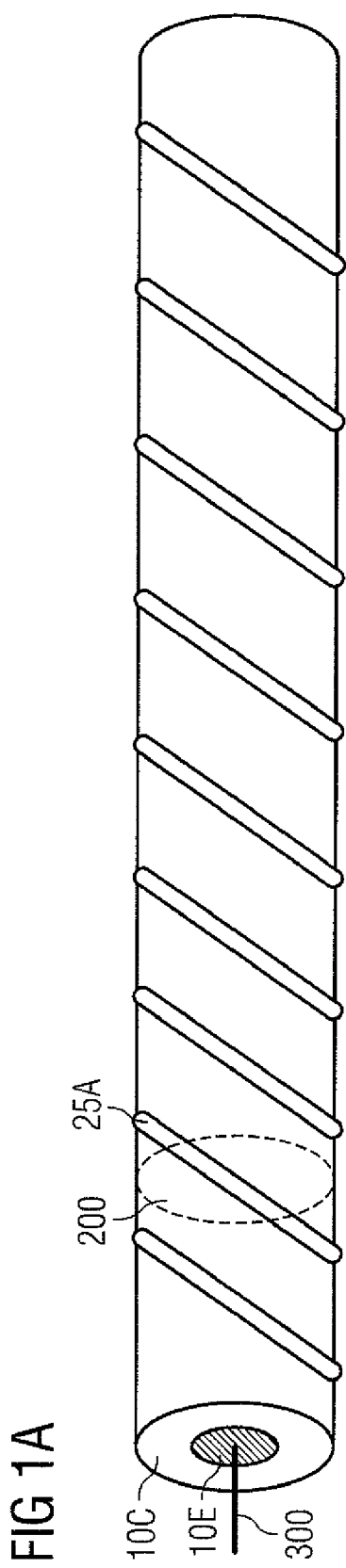
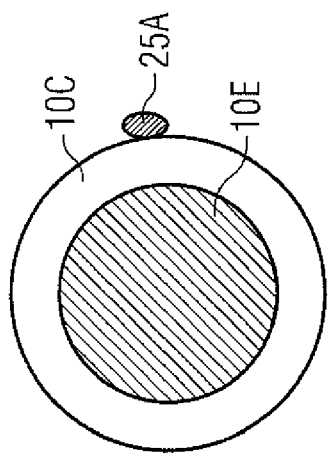
FIG 1A
FIG 1B

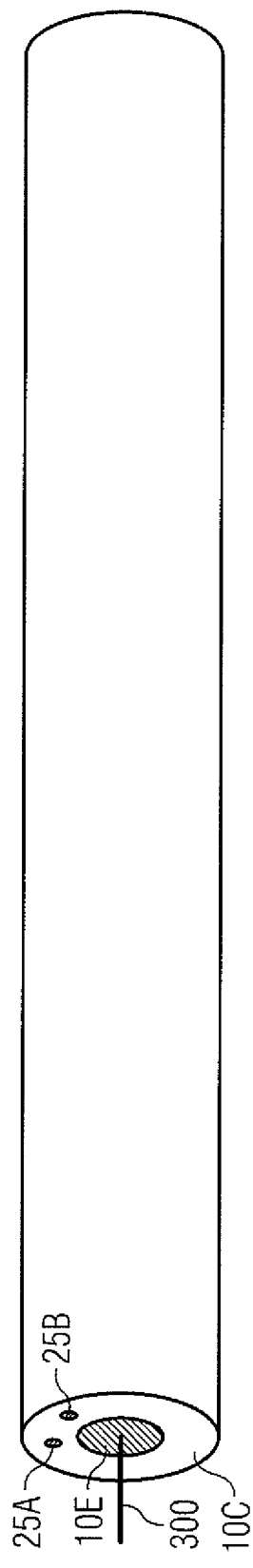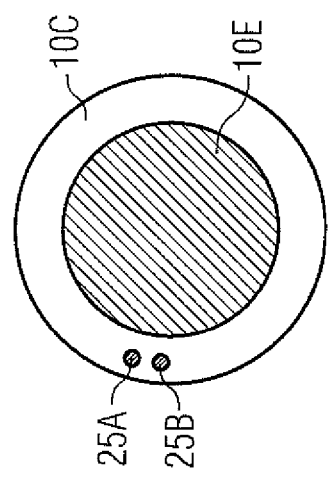

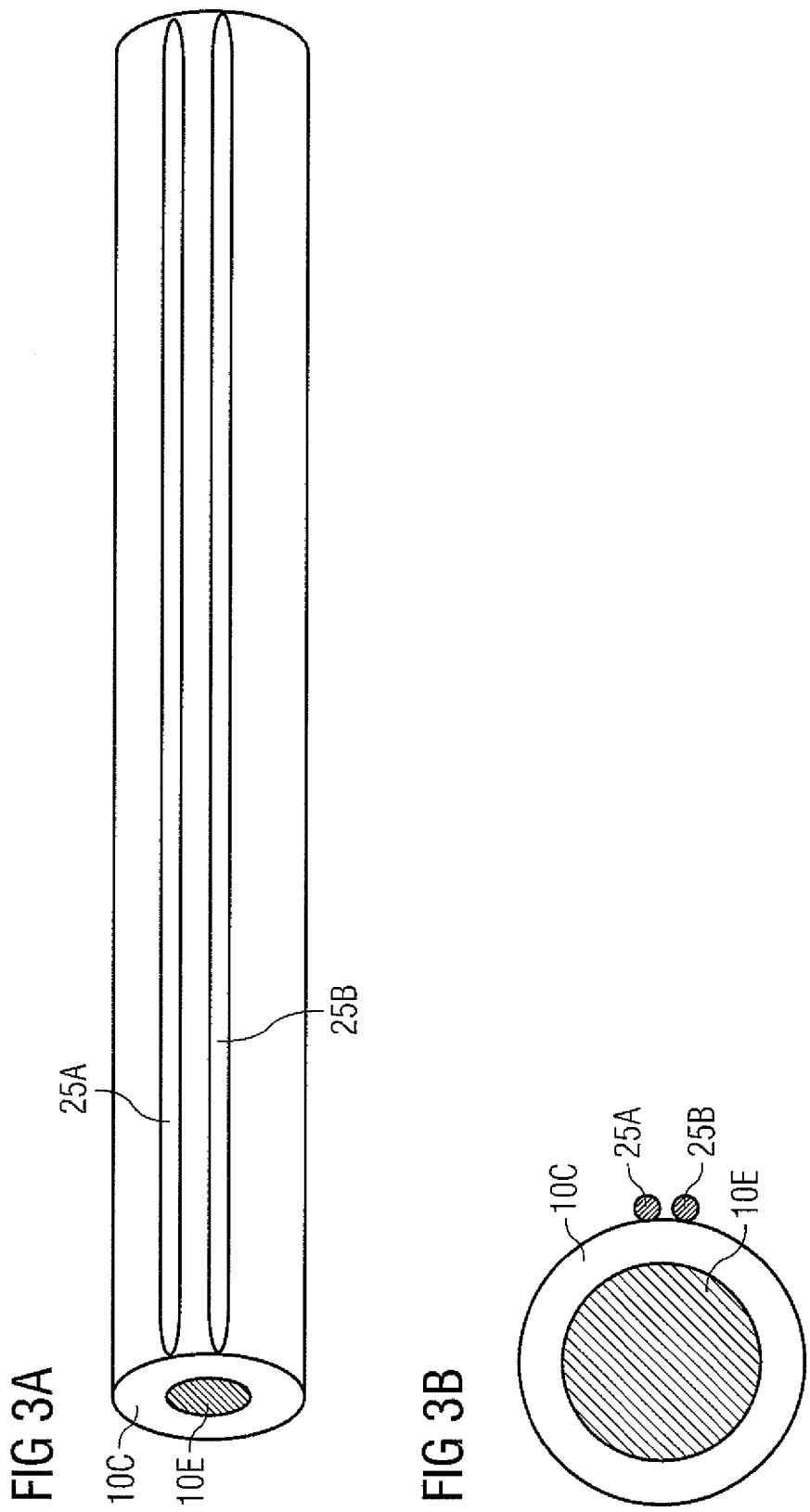

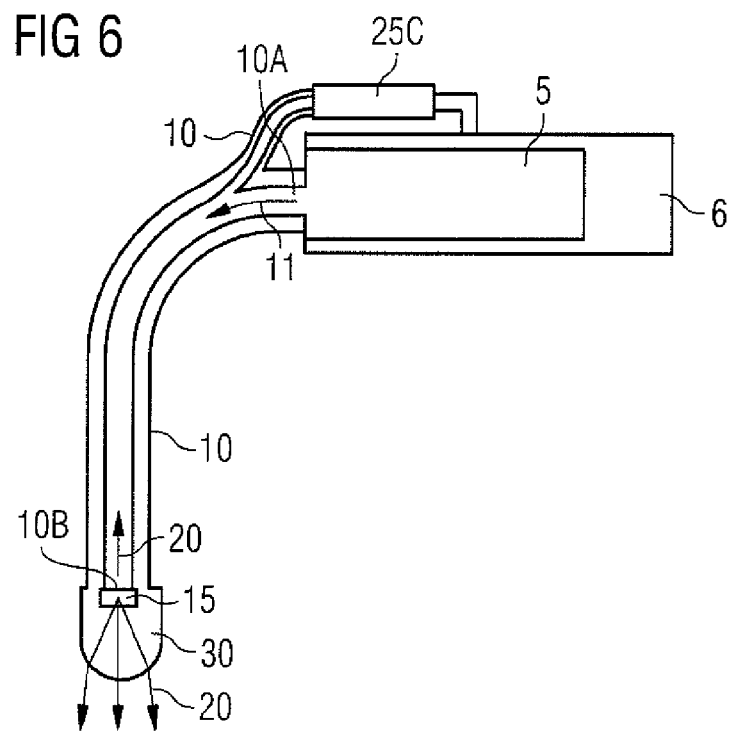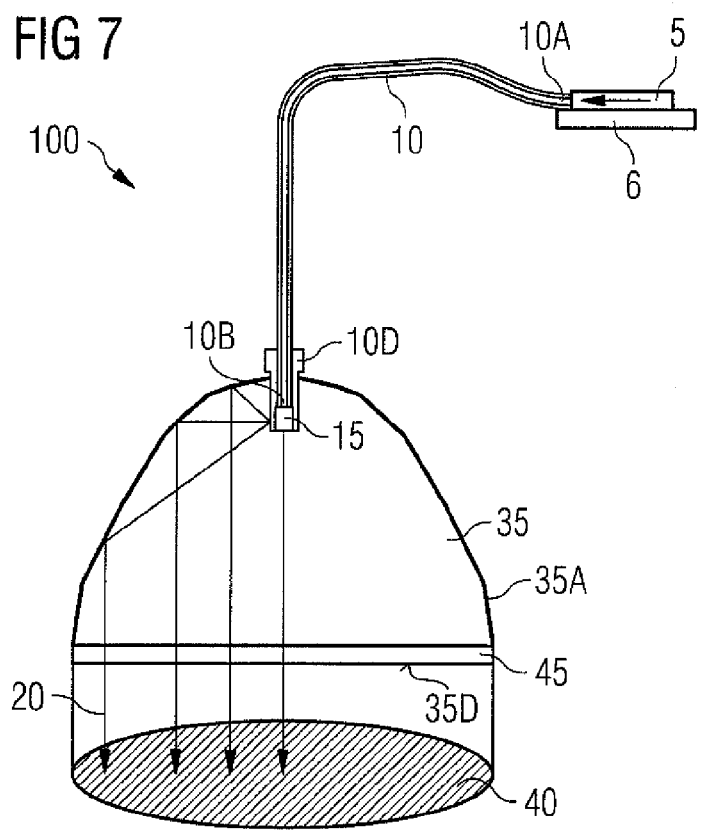

ARRANGEMENT COMPRISING A FIBER-OPTIC WAVEGUIDE

RELATED APPLICATIONS

This is a U.S. national stage under 35 USC §371 of application No. PCT/DE2007/001060, filed on Jun. 15, 2007.

This application claims the priority of German patent application no. 10 2006 029 204.9 filed Jun. 26, 2006 the entire content of which is hereby incorporated by reference.

BACKGROUND OF THE INVENTION

The invention relates to arrangements comprising a fiber-optic waveguide.

Fiber-optic waveguides used for guiding radiation or light can break or be damaged.

SUMMARY OF THE INVENTION

One object of specific embodiments of the invention is to provide an improved arrangement comprising a fiber-optic waveguide.

This and other objects are attained in accordance with one aspect of the invention directed to an arrangement comprising a fiber-optic waveguide and a detection device, wherein the fiber-optic waveguide comprises a core region and a cladding region surrounding the core region, and the core region has a higher refractive index than the cladding region, and wherein the detection device can detect damage to the fiber-optic waveguide.

In an arrangement of this type, the core region of the fiber-optic waveguide can guide light or radiation, e.g. short-wave radiation such as UV radiation, e.g. by means of reflection and interference owing to the refractive index jump from the core region to the cladding region. Damage to the fiber-optic waveguide can be reliably detected on account of the detection device.

In a further embodiment of the invention, the arrangement has a first electrically conductive connection as part of the detection device, which runs on or in the fiber-optic waveguide, e.g. in or on the cladding region of the fiber-optic waveguide, wherein the functionality of said first electrically conductive connection indicates the functionality of the fiber-optic waveguide. Furthermore, means for checking the functionality of said first electrically conductive connection can then be present, wherein the functionality of the first electrically conductive connection indicates the functionality of the fiber-optic waveguide.

In the case of a cable-type fiber-optic waveguide, for example a light-guiding rod or an optical fiber, the first electrically conductive connection advantageously runs along the principal axis of the fiber-optic waveguide and can therefore indicate damage to the fiber-optic waveguide particularly sensitively. Means for checking the functionality of said first electrically conductive connection can comprise a current supply, for example, which passes an electrical pulse into the first electrically conductive connection, for example a wire, and thus checks the length thereof over the course of the fiber-optic waveguide. The length of the first electrically conductive connection, for example of the wire, is then determined by means of the pulse reflection at the other end of the wire and the propagation time.

Furthermore it is possible for a second electrically conductive connection additionally to run through the fiber-optic waveguide, which connection forms an electric circuit with the first electrically conductive connection, and furthermore for the means for checking the functionality of said first electrically conductive connection to comprise a device which can detect the current flowing in the electric circuit. This can be a transistor circuit, for example, which supplies the radiation source with power only when the electric circuit is closed and thus indicates the intactness of the fiber-optic waveguide. The first and second electrically conductive connections can be combined to form a current loop, for example at the end of the fiber-optic waveguide at which the converter material is arranged, for example by means of a metal sleeve or a metal ring.

It is also possible for the second electrically conductive connection to run through the fiber-optic waveguide at a distance from the first electrically conductive connection, and for the means for checking the functionality of the first electrically conductive connection to be able to detect a voltage present between the first and second electrical connections. By way of example, it is possible to measure the capacitor effect between the first and second electrically conductive connections spaced apart from one another, and thus to check the intactness of the fiber-optic waveguide by means of a capacitance change or RC resonance shift.

Advantageously, the electrically conductive connections or the only one electrically conductive connection are or is more brittle than the core region. In this case it is then ensured that in the event of mechanical loading, the electrically conductive connections are interrupted before the fiber-optic waveguide actually breaks or is damaged. In this case, the electrically conductive connections can also run on or in the cladding region of the fiber-optic waveguide, or run e.g. between the cladding region and the core region.

Brittleness is generally understood to mean the property of solids of breaking apart when stressed, instead of undergoing plastic or elastic deformation. In this context reference is made to the key word "brittleness" in Römpp Chemielexikon, 9th extended and revised edition, Georg-Thieme-Verlag Stuttgart, to the entire contents of which reference is hereby made.

Furthermore, there are specific embodiments of the invention wherein the fiber-optic waveguide has a first end and a second end, wherein a converter material is present at the second end, which converter material converts radiation having a first wavelength that is transported through the fiber-optic waveguide into light having a second wavelength, and a first detector as part of the detection device is present at the first end, which detector detects the light having the second wavelength. This light having the second wavelength can e.g. be transported back by optical feedback through the fiber-optic waveguide and then be detected by the first detector.

The arrangement comprising the fiber-optic waveguide and the detection device can also be part of a light-emitting device wherein a radiation source is additionally present at the first end of the fiber-optic waveguide, which radiation source emits radiation having the first wavelength.

During the abovementioned conversion of the radiation having the first wavelength, preferably short-wave radiation such as e.g. UV radiation, the light having the second, longer, e.g. visible, wavelength that is generated by means of the converter material can be emitted isotropically in all directions by the converter material. During the conversion, converted light can be coupled into the fiber-optic waveguide, wherein said converted light is transported through the fiber-optic waveguide again to the first detector at the other end of the fiber-optic waveguide. In this case, a detection of converted light by the first detector indicates that the fiber-optic waveguide is functional and intact. In the case where converted light is no longer detected by the first detector, it should be assumed that owing to a break in the fiber-optic waveguide, for example, the converted light can no longer be transported from the converter material to the first detector. In this case, it is then particularly advantageous if the first detector or the detection device can switch off a power supply of the radiation source. By way of example, the detection device can be part of a circuit arrangement that supplies the power supply of the radiation source with current and interrupts this electric circuit in the absence of detection of the converted light. Furthermore, there is the possibility that the radiation source, for example a UV laser diode with low power, is switched on when the light-emitting device is switched on, and then during the start-up of the laser the original switch-on device for the laser is deactivated and instead a control circuit in which the detection device forms a component performs the control of the laser. Consequently, the laser is then operated only depending on the converted light having been detected by the detection device, and can be switched off immediately when detection of the converted light is no longer present.

By way of example, the first detector can be coupled to one end of a fiber-optic waveguide in light-guiding fashion, wherein the converter material is then arranged at the other end of this fiber-optic waveguide. This fiber-optic waveguide can be part of a larger fiber-optic waveguide assembly, for example of a fiber-optic waveguide bundle. In this case, the other fiber-optic waveguides of this bundle can then be connected to the radiation source and e.g. just this one fiber-optic waveguide fiber can be connected to the first detector. It is also possible to fit a beam splitter in the fiber-optic waveguide, which guides at least parts of the converted light transported back through the fiber-optic waveguide to the first detector.

It is particularly advantageous if the radiation source and the first detector are present at the same end of the fiber-optic waveguide or fiber-optic waveguide bundle. By means of back-reflection of the visible light converted by the converter material, the functionality of the fiber-optic waveguide can then be detected in a particularly simple manner over practically its entire length. Furthermore, high configurational freedom is then also possible for the optical system, e.g. the optical component or the transparent body at the other end of the fiber-optic waveguide.

Furthermore, between the end of the fiber-optic waveguide and the converter material there can also be one or a plurality of coatings, e.g. dielectric mirrors or other reflection layers, which are transparent to the radiation having the first wavelength but reflect parts of the converted light having the second wavelength. By way of example, there is the possibility that the dielectric mirror or mirrors reflect back the red components of the converted light, with the consequence that the emission from the fiber-optic waveguide is intensified, but do not reflect yellow components, wherein said yellow components are then fed back by the fiber-optic waveguide and can be detected e.g. by the first detector. However, it is also possible to configure the reflection layer such that it is transparent to the radiation having the first wavelength, but reflects a percentage proportion of the wavelength range of the light having the second wavelength, while the other portion is coupled into the fiber-optic waveguide again. In the case of both possibilities, the radiation efficiency of the device is increased by a reduction of the feedback of converted radiation having the second wavelength back into the fiber-optic waveguide.

Furthermore, it is possible for a second detector for detection of ambient light additionally to be present. Such a detector can for example detect the ambient light transported through a fiber-optic waveguide that is not connected to the radiation source, and can serve as a reference and reference point for the converted light detected by the first detector. By means of the first and second detectors it is thus possible more easily to increase the sensitivity of detection of the converted light and thus to obtain a monitoring system for the functionality of the fiber-optic waveguide which is particularly sensitive.

In the case of this light-emitting device, the light conversion efficiency can be increased by the converter material not being arranged in direct proximity to the radiation-emitting radiation source, but rather being separated from the radiation source by the fiber-optic waveguide. As a result, it is possible for example to reduce a reabsorption of the converted light having the longer, second wavelength by the radiation source. Furthermore, the location of visible light generation is spatially separated from the location of heat generation, of the radiation source, with the consequence that the operating temperature of the converter material can be lowered, which can increase the reliability thereof. Such a spacing apart of the converter material from the radiation source can also be referred to as "remote phosphor configuration". By means of the conversion, the radiation having the first wavelength can be converted into—preferably visible—light having a second wavelength, wherein the second wavelength is greater than the first wavelength of the exciting radiation.

In a further embodiment of the invention, the radiation-emitting radiation source emits short-wave radiation in the range of 210 to 500 nm, preferably in the range of 210 nm to 420 nm, more preferably in the range of 360 nm to 420 nm, or rather in the blue range of approximately 420 nm to 500 nm.

The presence of the arrangement comprising the fiber-optic waveguide and the detection device which can detect damage to the fiber-optic waveguide can be particularly advantageous in the case of short-wave radiation sources (e.g. UV radiation sources) since it is thereby possible rapidly to detect whether the fiber-optic waveguide is damaged and therefore short-wave light that is possibly harmful to the observer is also being emitted toward the outside.

Particularly advantageously, the detection device which can detect damage to the fiber-optic waveguide also monitors a power supply (current and/or voltage supply) for the radiation source preferably emitting short-wave radiation and can thus shut down the power supply in the event of damage to the fiber-optic waveguide, with the consequence that the potentially dangerous emission of short-wave radiation from the damaged fiber-optic waveguide is also interrupted. However, such monitoring is also possible in the case of a radiation source which emits e.g. light having a visible wavelength rather than short-wave radiation.

Furthermore, the radiation source can also emit high-energy light in the visible blue range of approximately 400 to 450 nm. The—preferably visible—converted light having the second wavelength that is emitted after conversion in this case has a longer wavelength than the radiation originally emitted by the radiation source and, depending on this radiation, can lie in a wavelength range of 400 to 800 nm.

In this case, the converter material can be a phosphor, in particular, which can be excited by the radiation emitted by the radiation source, for example to fluorescence. In the near UV it is possible to use for example oxide-based phosphors, such as, for example, barium magnesium aluminates doped with europium, such as, for example, $BaMgAl_{10}O_{17}:Eu^{2+}$. It is also possible to use strontium magnesium aluminates likewise doped with europium, such as, for example, $SrMgAl_{10}O_{17}:Eu^{2+}$, and also chlorapatites with strontium, barium or calcium having the formula $(Sr, Ba, Ca)_5(PO_4)_3Cl:Eu^{2+}$. It is also possible to use barium aluminates, for example $Ba_3Al_{28}O_{45}:Eu^{2+}$. All the compounds mentioned emit light in the blue wavelength range if they are pumped in the near UV. Green emitting phosphors are for example $SrAl_2O_4:Eu^{2+}$.

Green to green-yellow emitting phosphors are for example chlorosilicates having the formula $Ca_8Mg(SiO_4)_4Cl_2:Eu^{2+}$, $Mn^{2+}$, which are doped with europium or manganese, and also thiogallates having the general formula $AGa_2S_4:Eu^{2+}$, $Ce^{2+}$, wherein A can be selected from calcium, strontium, barium, zinc and magnesium. Furthermore, for example alkaline-earth-metal-substituted strontium sulfides having the general formula $((A, Sr)S:Eu^{2+}$ where A=alkaline earth metal ions, and also nitridosilicates having the formula $M_2Si_5N_5N_8$: $Eu^{2+}$ where M=Ca or Sr can be used as red emitted phosphors and converter materials.

The converter materials or phosphors can also be used in such a way that they emit visible white light upon excitation with short-wave radiation and the short-wave radiation is thus converted into visible white light. A mixture of, for example, 47% by weight of strontium chlorapatite, 48% by weight of strontium aluminate and 5% by weight of nitridosilicates can emit white light having a color locus x=0.354 and y=0.386 in the CIE standard chromaticity diagram given an excitation at 405 nm. In further embodiments of the invention, by means of the conversion of the radiation having the first wavelength, visible light having the second wavelength can also result which does not leave the observer with a white light impression, but rather has for example yellow, green, red or any other color. Furthermore, it is possible for light-emitting devices to emit light which is a mixture of non-converted short-wave radiation and converted light.

The fiber-optic waveguide can comprise for example fibers containing a material selected from glass and plastic. Consequently, the fiber-optic waveguide can also comprise fiber-optic cables or light-guiding rods. Fiber-optic waveguides based on glass are particularly well suited to coupling in and to transporting the short-wave light emitted by the radiation source in some embodiments of the invention. The fiber-optic waveguide can be constructed like a fiber, a cross section through such a fiber showing a core region having a high refractive index, which is surrounded by a cladding region having a lower refractive index than the core region. In this case, the core region is able to transport coupled-in modes of light and short-wave radiation for example by means of interference and reflection.

In a further embodiment of the invention, a plurality of fiber-optic waveguides can also be present, which are combined for example to form a fiber-optic waveguide bundle, in which case each individual fiber-optic waveguide can separately transport the radiation having the first wavelength emitted by the radiation source to the converter material after the coupling-in. In this case, a further embodiment of a light-emitting device according to the invention can also comprise a plurality of radiation sources, it being possible, for example, for one radiation source to be present for each respective fiber-optic waveguide. The radiation having the first wavelength emitted by these radiation sources can then be concentrated by means of the fiber-optic waveguides in a fiber-optic waveguide bundle, for example, and, after the transport of the radiation through the fiber-optic waveguide bundle, can be converted into the light having the second, longer wavelength by means of the converter material. In this case, it is also possible for the radiation of the different radiation sources which is coupled into different fiber-optic waveguides to be converted into visible light having different second wavelengths by means of different converter materials, a mixture of this visible light having different wavelengths then resulting in a homogeneous white light impression for the observer.

Thus, it is possible to use e.g. the optical components and/or transparent bodies that will be described further below for such a mixture.

It is possible that in specific light-emitting devices comprising arrangements comprising the fiber-optic waveguide and the detection device, the fiber-optic waveguide has a first end and a second end, wherein a radiation source is present at the first end, of the fiber-optic waveguide, which radiation source emits radiation having a first wavelength and an optical component is additionally present at the second end, which optical component interacts with the converted light or with the radiation emerging from the fiber-optic waveguide. Said optical component can interact for example—if the converter material is present—with the converted light or with the radiation having the first wavelength that emerges from the fiber-optic waveguide, e.g. short-wave radiation such as UV radiation, by means of scattering, refraction, reflection, deflection or diffraction. The optical component can comprise a lens, for example, which can concentrate the converted light, for example. If the light-emitting device contains a plurality of fiber-optic waveguides which are combined to form a bundle, for example, then this bundle can be inserted for example into a common hole in the optical component.

In a further embodiment of the invention, the converter material can be arranged at an end of the fiber-optic waveguide and this end can be arranged at the focal point of the optical component.

In the case of such a light-emitting device, the visible light having a longer wavelength that is generated by means of the converter material is then emitted in parallel fashion through the optical component, for example a lens, such that a parallel directional light emission of the converted light in a particular emission direction is possible.

Furthermore, it is also possible for the end of the fiber-optic waveguide with the converter material to be arranged outside the focal point of the optical component and then to be able to serve for example for the defocusing of the visible light generated by means of conversion. In this way, e.g. the emission from a point light source which can arise as a result of the conversion of the e.g. UV radiation to visible radiation at an end of an optical fiber as a fiber-optic waveguide can be expanded with the consequence that a larger area can then also be illuminated by the point light source.

The radiation source can comprise for example a short-wave radiation source, in particular a UV laser diode, for example an N-based laser diode such as e.g. an InGaN laser diode. In particular, it is possible to use materials having the general formula $Al_xIn_yGa_zN$ where x, y, z≧0 and x+y+z=1, for example a laser diode having an emission wavelength of 365 nm to 425 nm with an In content of 0-10 atom % (for example x=0; y=0-0.1; z=0.9-1.0) in the light-generating layer. UV laser diodes are particularly well suited to emitting a directional UV radiation that can readily be coupled into a fiber-optic waveguide.

Light-emitting devices according to the invention can achieve a particularly good optical imaging quality, for example, by virtue of the fact that a bright point-like light source is realized by the radiation having the first wavelength (e.g. UV radiation) from the radiation source being transported through a fiber-optic waveguide, which is an optical fiber for example. Particularly good point light sources can be obtained by using UV lasers with fiber-optic waveguides and converter materials. Point light sources have a narrowly delimited spatial extent, with a large contrast between illuminated and non-illuminated regions.

The radiation source can be connected to a heat sink, for example, for the purpose of dissipating the heat loss. In this case, the radiation source can be connected directly to the heat sink, or be in thermal contact with it.

In a further embodiment of light-emitting devices according to the invention, the converter material can comprise nanoparticles. The advantage of nanoparticles may consist in the fact that, in the case of said nanoparticles, the light scattering is reduced and the luminous intensity of the visible light emitted by the converter material thus becomes more uniform. The nanoparticles advantageously have particle diameters which are a few nanometers, for example between 2 and 50 nm, more preferably between 2 nm and 10 nm, since such small nanoparticles reduce light scattering of the converted visible light particularly well. Furthermore, the particle diameter can also influence the wavelength of the converted light for example on account of the quantum size effect. Thus, nanoparticles having relatively small diameters generate converted light having a shorter wavelength in comparison with nanoparticles having relatively large diameters.

In a further embodiment of a light-emitting device according to the invention, an end of the fiber-optic waveguide is connected to a transparent body in light-guiding fashion. For example, it is possible that an end of the fiber-optic waveguide is surrounded by the transparent body and can be inserted into a hole in the transparent body, for example. The transparent body can be a glass or plastic body, for example, wherein the transparent body can be either a hollow body or be embodied in solid fashion. The transparent body is advantageously transparent to the converted visible light or else transparent to the radiation having the first wavelength that is transported through the fiber-optic waveguide, preferably short-wave radiation such as UV radiation. On at least partial regions of the surface of the transparent body it is possible to provide a layer that reflects short-wave radiation or a layer that reflects radiation having the first wavelength or corresponding absorption layers, in order for example to prevent or reduce an emission of non-converted short-wave light from the light-emitting device.

Expediently, the end of the fiber-optic waveguide, in light-guiding fashion, is connected to the transparent body, or surrounded by the latter, from which emerges the radiation from the radiation source that is transported into the fiber-optic waveguide.

Furthermore, it is possible for the conversion material for converting the radiation having the first wavelength (e.g. UV radiation) into light having a second wavelength (e.g. visible light) to be present at the end of the fiber-optic waveguide at which the transparent body is present.

Furthermore, a coating that is reflective to the converted light can be arranged at least on partial regions of the surface of the transparent body. Said coating can then e.g. concentrate the converted visible light generated by means of the conversion material at the end of the fiber-optic waveguide onto an area to be illuminated.

Furthermore, it is possible for the transparent body to have a light exit area whose geometrical form very substantially determines the form of an area to be illuminated.

By way of example, it is possible to shape a round, oval or for example rectangular or triangular light exit area onto the transparent body, which then form a corresponding freeform area used for illuminating the surroundings. In this way, it is possible, for example, to convert point light sources which emit visible light generated by means of conversion at the end of the fiber-optic waveguide into area light sources that cover larger areas. The transparent body can form a paraboloid, for example, with a round or oval light exit area, which then forms a corresponding area light source. By way of example, the transparent body can have an elongated, for example rod-type, light exit area, which can then be used for illuminating larger areas than is usually the case with point light sources.

By way of example, it is possible for the transparent body to contain at least one cavity in which the converter material is arranged, wherein the cavity is connected to the fiber-optic waveguide or an end of the fiber-optic waveguide in light-guiding fashion. The cavity can be elongated, for example, and then extend along a principal axis of the likewise elongated transparent body and thus bring about an expansion of the point light source.

By way of example, the transparent body can also contain a light-guiding medium, for example a light-guiding rod or a fiber-optic waveguide such as an optical fiber, which runs along the principal axis of the transparent body, wherein said light-guiding medium is connected to the end of the fiber-optic waveguide in light-guiding fashion. The surface of such a light-guiding medium can be roughened, for example, and thus manifest a diffuser effect by means of which the light can be coupled out from the light-guiding medium into the transparent body in a particularly simple manner. The conversion material can be arranged in the light-guiding medium or on the surface thereof.

The converter material can be arranged for example in layered fashion in the beam path of the radiation having the first wavelength that is transported through the fiber-optic waveguide. In this case, the radiation is expediently concentrated by a reflector and guided onto the converter layer and converted there first into visible light.

In further embodiments of light-emitting devices according to the invention, a layer that reflects radiation having the first wavelength and is transmissive to visible light is disposed downstream of the converter material in the beam path of the device. Said layer can be for example a dielectric mirror for short-wave radiation. Such a layer can advantageously prevent an emission of non-converted short-wave radiation from the light-emitting device and reflect back the non-converted short-wave radiation e.g. to the converter material. Consequently, such a layer that reflects short-wave radiation firstly reduces or prevents the emission of the potentially harmful short-wave radiation from the light-emitting device and at the same time increases the efficiency of the light conversion by the back-reflection.

Further embodiments of the invention also relate to an illumination device comprising one of the abovementioned light-emitting devices, in particular comprising the arrangements according to the invention. Such an illumination device can be for example a lamp, table luminaire, ceiling luminaire or any other illumination devices.

A further embodiment of the invention also relates to a display comprising one of the abovementioned light-emitting devices. A light-emitting device which emits a narrow light strip of converted light is particularly advantageously used as a component of such a display. Such a light strip is for example particularly suitable for coupling into a glass/plastic plate for LCD back-lighting.

Consequently, the invention according to further embodiments also relates to displays in which the backlighting contains a light-emitting device as described above. The displays are preferably not themselves emissive and are for example liquid crystal displays.

Further embodiments of the invention also relate to a vehicle comprising a headlight containing a light-emitting device as described above. The vehicle can be e.g. a motor vehicle or rail vehicle and have an engine with a cooling system. In this case, it is advantageous if the radiation source of the light-emitting device is in thermal contact with the cooling system. In this case, it is possible in a particularly simple manner to cool not only the engine but also the radiation source of the light-emitting device by means of the cooling system.

BRIEF DESCRIPTION OF THE DRAWINGS

The invention will be explained in even more detail below on the basis of exemplary embodiments and figures. The figures are schematic drawings that are not true to scale. In the various figures, elements provided with identical reference symbols identify identical or identically acting elements.

FIGS. 1A to 3B show fiber-optic waveguides with differently configured electrically conductive connections.

FIGS. 4 to 6 show different embodiments of light-emitting devices according to the invention into which an arrangement comprising the fiber-optic waveguide and the detection device can be integrated.

FIGS. 7 to 11 show further embodiments of light-emitting devices according to the invention with a transparent body.

DETAILED DESCRIPTION OF THE DRAWINGS

FIGS. 1A and 1B show a fiber-optic waveguide 10 comprising a core region 10E and a cladding region 100 surrounding the core region 10E, the core region having a higher refractive index than the cladding region. The core region can conduct light or radiation, for example short-wave radiation such as UV radiation, by reflection and interference. A first electrically conductive connection 25A is present on the surface of the cladding region 100, which connection winds around the cladding region or is arranged peripherally around the fiber-optic waveguide and can thus detect possible damage or a fracture of the fiber-optic waveguide at a wide variety of locations. FIG. 1B is in this case a cross section through the fiber-optic waveguide at the position marked by 200. Instead of one electrically conductive connection 25A, two electrically conductive connections could also run on the cladding region 10C in this way, in which case they then form a closed electric circuit for example as described above or it is possible to determine the capacitor effect between the connections running parallel and damage to the fiber-optic waveguide could thus be detected.

In contrast to FIGS. 1A and 1B, in the case of the fiber-optic waveguide shown in FIGS. 2A and 2B, a first electrically conductive connection 25A and a second electrically conductive connection 25B run in the cladding region 100 of the fiber-optic waveguide 10. FIG. 2B is again a cross section through the fiber-optic waveguide 10 shown in FIG. 2A. Instead of two electrically conductive connections 25A and 25B, it is also possible for just one electrically conductive connection to run through the cladding region 100. In this case, the two electrically conductive connections can for example run parallel to the principal axis 300 of the fiber-optic waveguide 10, or else be wound around it as shown in FIGS. 1A and 1B.

In the case of the fiber-optic waveguide shown in FIG. 3A and in cross section in FIG. 3B, a first electrically conductive connection 25A and, parallel thereto, a second electrically conductive connection 25B run on the surface of the cladding region 100 of the fiber-optic waveguide 10. These electrically conductive connections can for example be joined together to form an electric circuit as described above or a capacitor effect that occurs in the case of these parallel connections can be measured and damage to the fiber-optic waveguide can thus be reliably detected.

Figure 4:
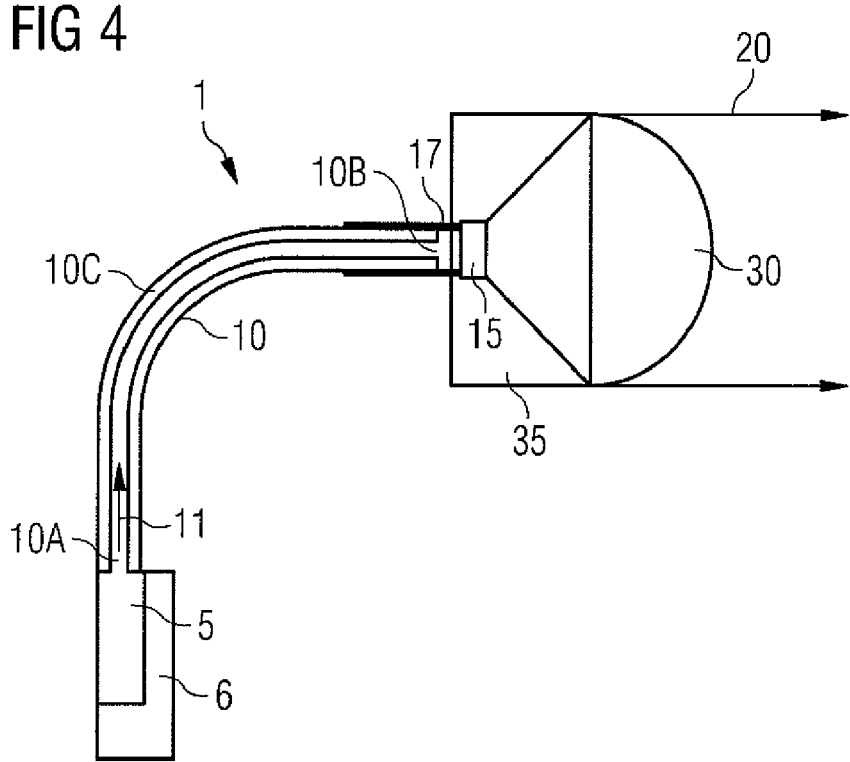

FIG. 4 shows a light-emitting device 1 wherein a radiation source 5, for example a UV diode laser, which is thermally conductively connected to a heat sink 6, emits UV radiation 11 that is coupled into a fiber-optic waveguide 10. In this case, the light 11 emitted by the UV radiation source 5 is coupled in at the end 10A of the fiber-optic waveguide 10. The fiber-optic waveguide 10 also comprises a cladding region 10C. The UV radiation 11 transported through the fiber-optic waveguide 10 is coupled out from the fiber-optic waveguide 10 at the second end 10B of the fiber-optic waveguide 10 and is converted into visible light having a longer wavelength 20 by a converter material 15.

The transparent body 35 is fixed to the fiber-optic waveguide 10 by means of the plug connection 17. Situated between the fiber-optic waveguide and the transparent body is the converter material 15, which can also be applied on the fiber-optic waveguide or can be accommodated by means of a hole in the transparent body 35 (glass or plastic body). Said transparent body is transparent to the converted light 20 and advantageously has on its surfaces a coating (not shown here) that absorbs short-wave radiation or reflects short-wave radiation. In the beam path, an optical component 30, a lens, is disposed downstream of the transparent body 35. In this case, the converter material 15 is advantageously situated at the focus (focal point) of the optical component 30, such that the converted light 20 interacting with the optical component 30 is emitted in parallel fashion and directionally in a preferred direction. Both the lens and the transparent body bring about an expansion of the point light source occurring at end 10B of the fiber-optic waveguide 10. The optical component 30 and the transparent body 35 can also be shaped in one piece.

Figure 5:
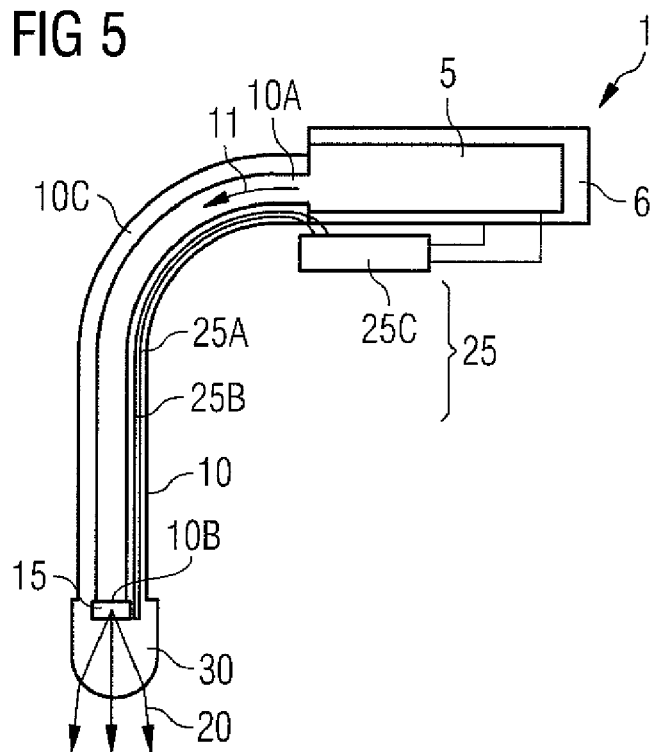

FIG. 5 shows another embodiment of a light-emitting device according to the invention, in which a detection device 25 is present, which can detect damage to the fiber-optic waveguide 10. In this case, a first electrical connection 25A formed as a wire and a second electrically conductive connection 25B likewise formed as a wire run parallel to one another in the cladding region 10C of the fiber-optic waveguide 10. The two electrically conductive connections 25A and 25B are joined together to form an electric circuit and are in electrical contact with the means 25C for checking the functionality of the electrically conductive connection. It can be inferred from figure 5 that said means 25C, for example a transistor circuit, simultaneously supervise the power supply for the radiation source 5. If the closed electric circuit composed of the electrically conductive connections 25A and 25B is interrupted on account of damage to the fiber-optic waveguide 10, the power supply for the radiation source 5 can thus also be immediately shut off and the emission of potentially harmful short-wave radiation 11 from the light-emitting device 1 can thus be prevented. The converter material 15 is followed directly by a lens as optical component 30, which provides for a directional concentration and emission of the converted light 20.

The light-emitting device 1 illustrated in FIG. 6 has a different detection device 25C that can detect damage to the fiber-optic waveguide 10. A fiber-optic waveguide bundle is used in this case, wherein the end 10A of a fiber-optic waveguide 10 of the bundle is connected to a detector 25C for visible light in light-guiding fashion. The radiation source 5 emits short-wave radiation 11, which is coupled into the fiber-optic waveguide at the end 10A of the fiber-optic waveguide bundle and is converted into visible light having a longer wavelength 20 by means of the converter material 15 at the other end 10B of the fiber-optic waveguide 10. It can be discerned that one portion of the converted visible light 20 is focused by a lens as optical component 30 and emitted in directional fashion from the light-emitting device. Another portion of the converted light 20 is fed back from the converter material layer 15 into the fiber-optic waveguide 10 and can then be detected by the detector 25C in this case. Said detector 25C likewise monitors the power supply of the radiation source 5 (UV laser diode) and can switch off the current supply in the absence of detection of the visible converted light 20, with the result that a further emission of UV light from the laser is prevented.

Instead of concentration or focusing optics it is also possible to use defocused optics, diverging lenses or lens systems and adjustable zoom optics in light-emitting devices according to the invention.

FIG. 7 shows an illumination device 100, in which a light-emitting device in accordance with one embodiment of the invention is integrated. In this case, too, the short-wave radiation emitted by the radiation source 5 is coupled into a fiber-optic waveguide 10 at one end 10A of the fiber-optic waveguide and is converted into converted visible light after transport through the fiber-optic waveguide 10 at the other end 10B of the fiber-optic waveguide by means of a converter material 15. The converter material 15 is situated directly at the end 10B of the fiber-optic waveguide 10 in order to minimize the unintentional emission of short-wave radiation. The converted visible light 20 is coupled into the transparent body 35, for example a solid glass body, and is reflected by the reflective coating 35A on the surface of the transparent body 35, such that the converted light is emitted in directional fashion onto an area 40 to be illuminated. In this case, the transparent body 35 has a parabolic shape. The converter material 15 is situated at the focal point of this parabolic mirror in order to achieve a particularly good focusing of the converted radiation. Furthermore, a coating 45 that reflects short-wave radiation is arranged at the light exit area 35D of the transparent body 35, which coating prevents the unintentional emission of non-converted short-wave radiation. The transparent body 35 can also be a hollow body, for example a curved mirror. This hollow body can then have a cover transparent to visible light on the light exit area 35D, said cover being coated with the coating 45 that reflects short-wave radiation. The coating 45 that reflects short-wave radiation can be a dielectric mirror, for example, which is tailored to the wavelength of the short-wave radiation source. The reflective coating 35A can be a mirror-coated area or enable a total reflection of the converted radiation by means of a refractive index jump or else comprise a combination of a mirror-coated area with a refractive index jump. It is possible, for example, for one partial region to be mirror-coated and another partial region to have shallow angles of light incidence and therefore to effect reflection by a refractive index jump without any losses. Furthermore, an interlayer having a low refractive index below the reflective coating 35A is also possible. The geometrical 3D shape of the transparent body 35 can furthermore be configured in such a way that the parabolic curvature in two sectional planes rotated about the optical axis with respect to one another are different, whereby an elliptical light distribution then results.

Illumination devices 100 of this type can generate a sharp light spot 40 and can be used for example as reading luminaires, headlights, and also theater spotlights.

Figure 8:
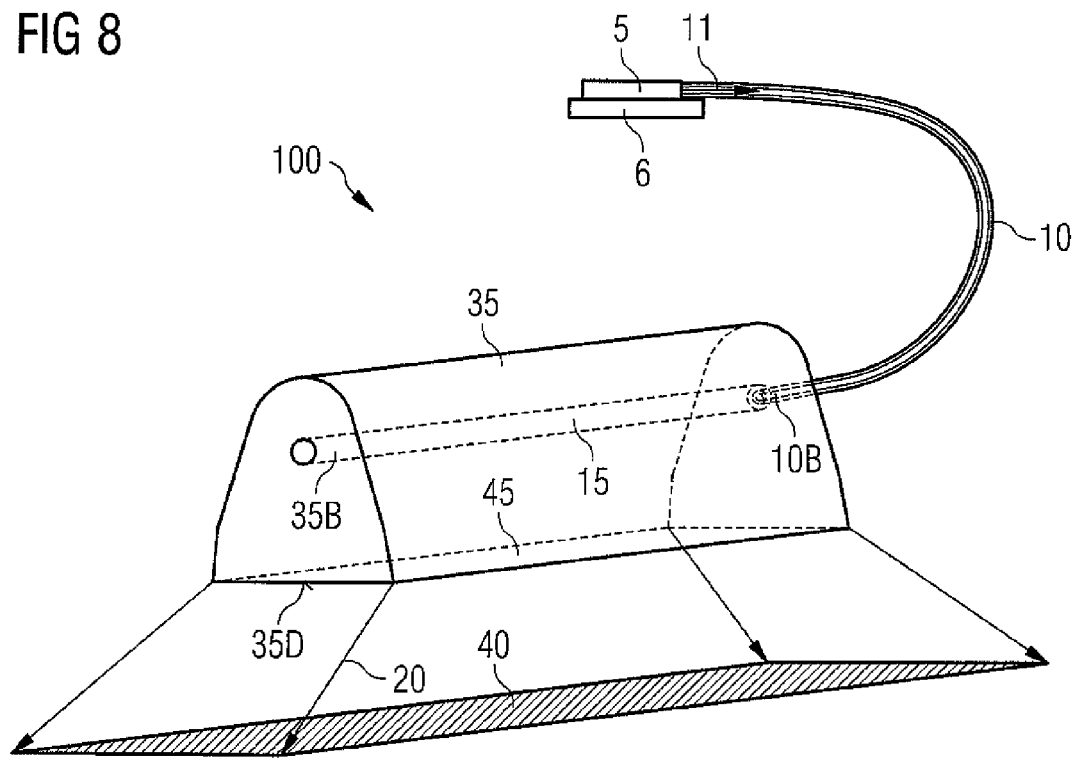

In contrast to the illumination device 100 in FIG. 7, a rectangular area 40 to be illuminated is illuminated in the case of the illumination device 100 illustrated in FIG. 8. In this case, the transparent body 35 has an elongated parabolic shape having for example a light exit area 35D with a rectangular cross section. It can clearly be discerned that the geometrical shape of the light exit area 35D also very substantially determines the geometrical shape of the area 40 to be illuminated, wherein the area 40 to be illuminated is somewhat more elongated than the light exit area 35D. In this illumination device 100, too, the short-wave radiation is transported via a fiber-optic waveguide and coupled into the transparent body 35 at the end 10B of the fiber-optic waveguide 10. In this case, there is situated in the transparent body 35 a hole that runs along the principal axis of the transparent body 35 and is filled with converter material 15, which converts the short-wave radiation 11 into visible light 20. Said converter material 15 can comprise nanoparticles, for example, since, in the case of the latter, the light scattering is reduced and the luminous intensity of the hole with the converter thus becomes more uniform. At the surface of this transparent body 35, the converted visible light 20 can then be reflected for example by means of a refractive index jump or by a mirror coating or both and can be coupled out through the light exit area 35D. The light exit area 35D of the transparent body 35 is provided with a coating 45 that reflects short-wave radiation, which coating prevents the emission of non-converted short-wave radiation.

This arrangement can form a well-defined luminous line that simultaneously enables a uniform brightness by means of the converter materials comprising nanoparticles. Furthermore, sharp bright-dark boundaries can be obtained by the positioning of this rod-like illumination device 100 in the parabolic body.

Figure 9:
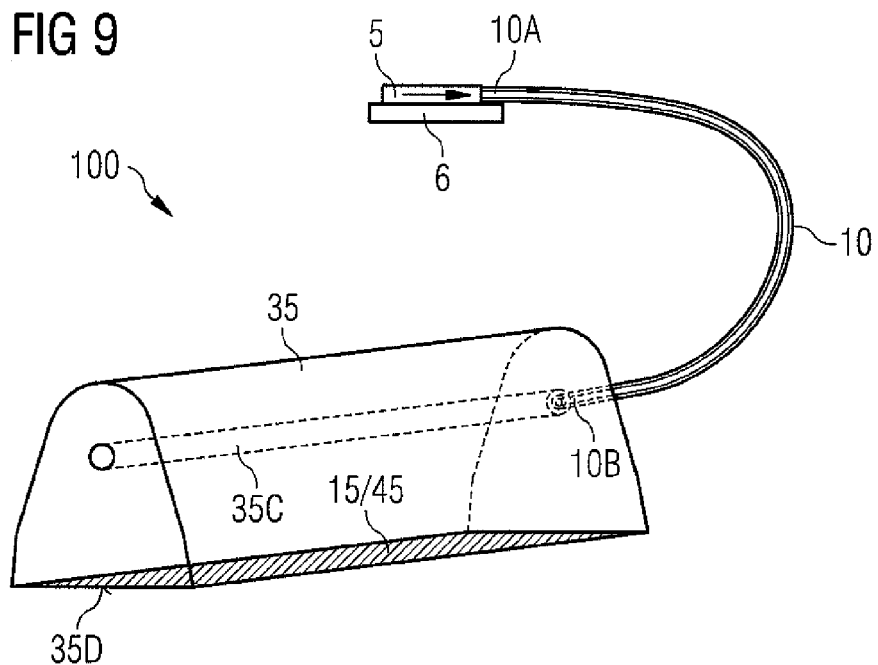

FIG. 9 shows a similar illumination device 100 to the illumination device shown in FIG. 8. In FIG. 9, there is situated in the hole in the transparent body 35 a light-guiding medium 35C, for example a glass rod or an optical fiber, which is connected to the end 10B of the fiber-optic waveguide 10 in light-guiding fashion. The light-guiding medium can be a glass rod, as already stated, which has a converter coating. The glass rod can be for example less than 1 mm thick, for example below 100 μm. When using laser diodes as the radiation source 5 and on account of the small dimensions of the luminous rod, it is possible to realize a very compact illumination device 100 in conjunction with a particularly high luminance. Illumination devices of this type can for example also be used as display backlighting with high coupling-in efficiency into the backlighting plate, for example in the case of laptops.

It is also possible for the light-guiding medium 25C not to comprise a converter material. With such an arrangement, too, the light exit area 35D can preferably also be roughened or contain scattering centers and thus itself be a secondary luminous area. Such an embodiment is advantageous when a freeform luminous area is required which, if appropriate, can be imaged optically on areas or objects to be illuminated. The light-guiding medium 35C can preferably likewise be roughened on its surface (roughened rod or fiber) or contain scattering centers and the coupling-out of light from the light-guiding medium can thereby be improved. The coating that reflects short-wave radiation can then also be arranged together with the converter coating 15 and 45 on the light exit area 35D.

Figure 10:
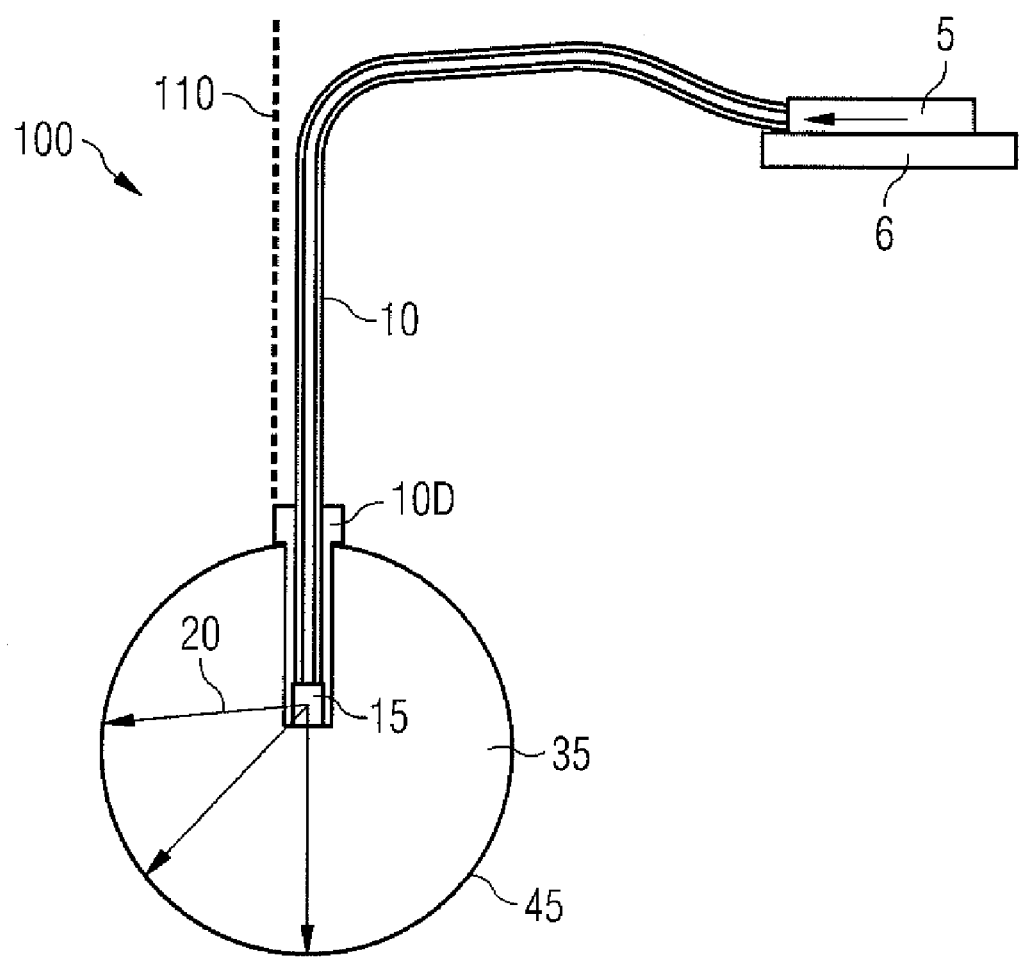

FIG. 10 shows a ceiling illumination device 100, comprising a luminaire suspension 110 for fixing to the ceiling. In this case, the short-wave light transported through the fiber-optic waveguide 10 is converted into visible light 20 by means of the converter material 15 at the end of the fiber-optic waveguide and is then coupled into a spherical transparent body 35, which can be either a solid body or a hollow body. Furthermore, a fiber-optic waveguide fixing 10D is also present at the transparent body 35. A coating 45 that reflects short-wave radiation can then be situated on the outer surface of this transparent spherical body, which coating reflects non-converted short-wave light.

Figure 11:
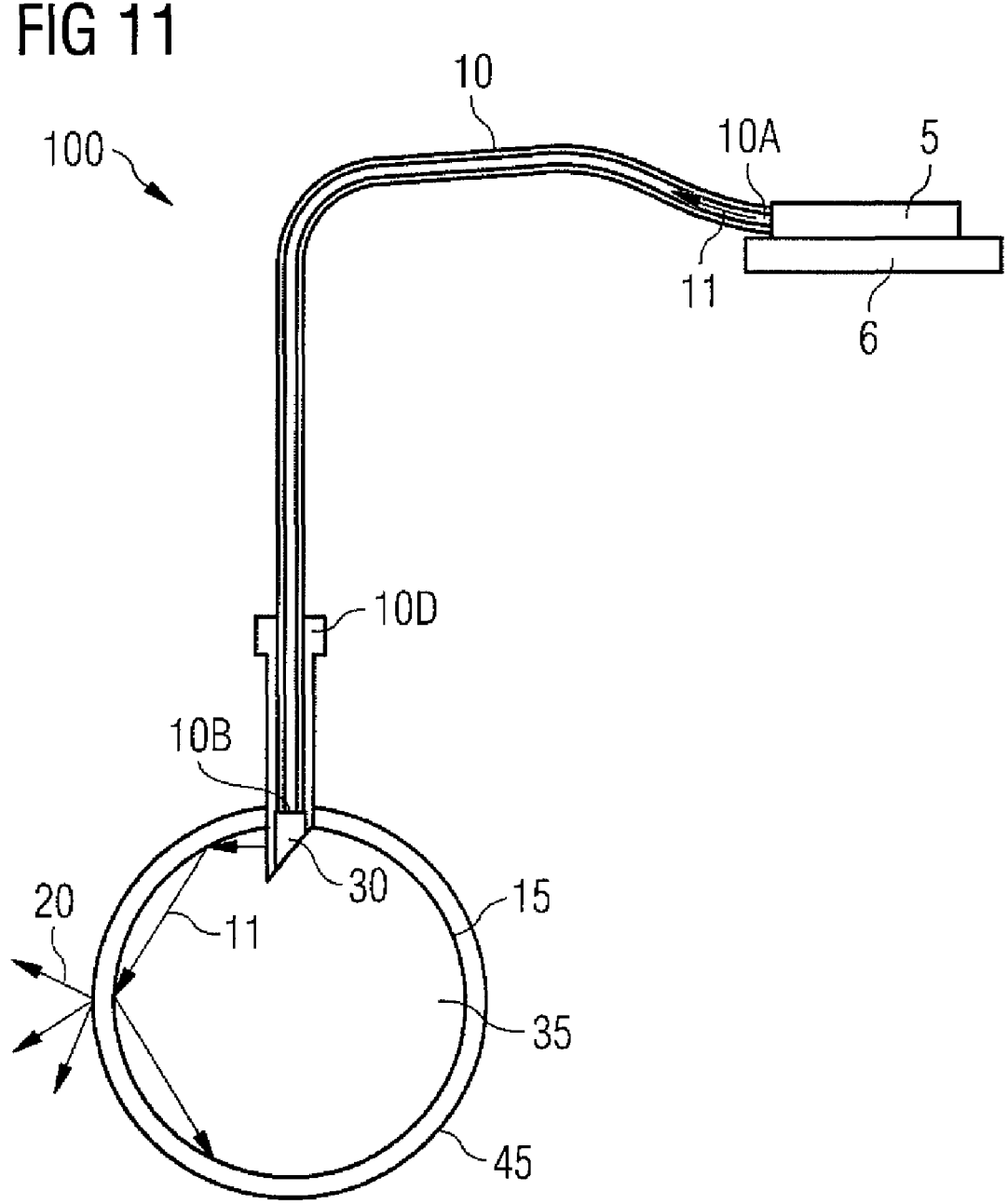

In the case of the ceiling illumination device 100 in FIG. 11, the short-wave radiation 11 is coupled into the transparent body 35 at the end 10B of the fiber-optic waveguide 10 by means of an optical component 30, which can comprise a divergent lens or divergent optical system, which transparent body can again be a hollow or solid spherical body and can consist of glass or plastic, for example. In the case of a hollow body it is possible, for example, for a converter material 15 to be arranged on the inner surface of the hollow body 35, which converter material converts the short-wave light 11 into converted light 20. A coating 45 that reflects short-wave radiation can then be present on the outer surface of this hollow sphere, which coating reflects or absorbs non-converted short-wave radiation. Converted light 20 can then be coupled out from this body 35 and for example a pendant illumination can thus be realized. The advantage of this ceiling illumination device 100 is that the irradiance of the converter material 15 is low in comparison with an arrangement wherein said material 15 is arranged directly at the end 10A of the fiber-optic waveguide 10. A higher conversion efficiency can be achieved as a result.

The optical component 30 can also comprise a deflection prism that provides for the short-wave radiation to be radiated in at a shallow angle, such that said radiation is frequently reflected back into the transparent body 35 at the coating that reflects short-wave radiation, such that a more uniform illumination is achieved after the conversion.

Furthermore, in all of the embodiments mentioned it is possible for the converter material or the converter nanoparticles to be arranged in the volume of the transparent body 35 if the latter is a solid body.

Figure 12:
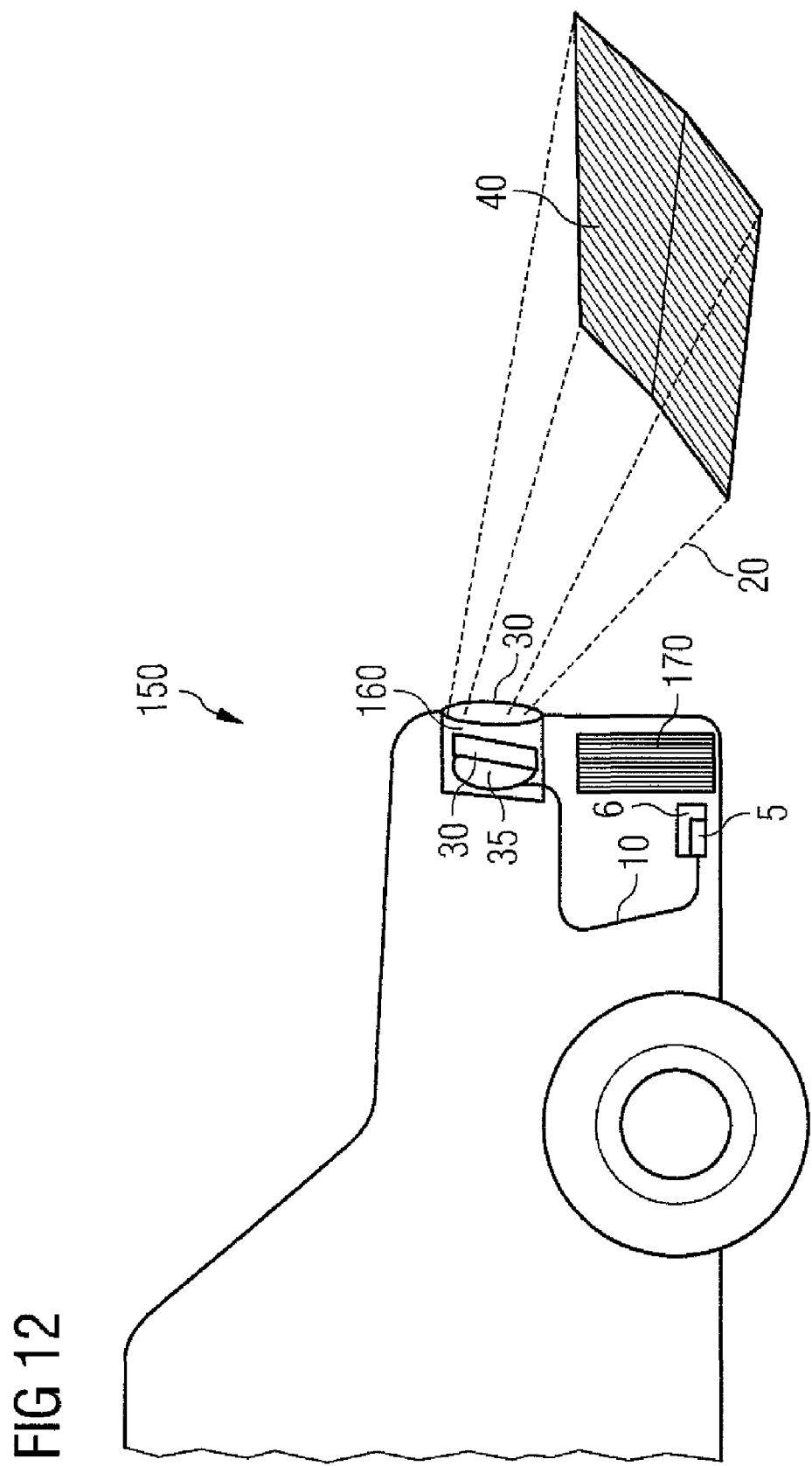
FIG. 12 schematically shows an automobile with a headlight comprising a light-emitting device according to the invention.

FIG. 12 shows a vehicle 150 having a headlight 160 containing a light-emitting device 1 according to one embodiment of the invention. It can be discerned here that the headlight 160 has arranged in it the transparent body 35, and optionally further optical components 30 which provide for a directional emission of the radiation 20 generated. Furthermore, a cooling body 170 is present, which serves for the cooling of the engine, in which case the radiation source 5 with the heat sink 6 is then particularly advantageously arranged so near to the cooling system 170 that thermal coupling is effected and the cooling system 170 also cools the radiation source 5.

The invention is not restricted to the embodiments illustrated here. In particular, the features shown in specific embodiments can also be implemented in the other embodiments. Further variations are for example also possible with regard to the geometrical configuration of the transparent body 35. Instead of short-wave radiation sources it is possible e.g. also to use radiation sources which emit visible light, which is then correspondingly converted.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An arrangement comprising a fiber-optic waveguide and a detection device, wherein the fiber-optic waveguide comprises a core region and a cladding region surrounding the core region, wherein the core region has a higher refractive index than the cladding region,
    wherein the detection device is adapted to detect damage to the fiber-optic waveguide,
    wherein the fiber-optic waveguide has a first end and a second end, wherein a converter material is present at the second end, wherein the converter material converts radiation having a first wavelength that is transported through the fiber-optic waveguide into light having a second wavelength, and a first detector as part of the detection device is present at the first end, wherein the first detector detects the light having the second wavelength, and
    wherein a reflection layer is fitted at the second end between the converter material and the fiber-optic waveguide, wherein the reflection layer is transparent to the radiation having the first wavelength and reflects part of the light having the second wavelength.

2. The arrangement as claimed claim 1, wherein a first electrically conductive connection is present as part of the detection device and runs in or on the cladding region of the fiber-optic waveguide, and
    wherein a functionality of said first electrically conductive connection indicates the functionality of the fiber-optic waveguide.

3. The arrangement as claimed in claim 2, wherein the fiber-optic waveguide has a principal axis, and
    wherein the first electrically conductive connection runs along the principal axis of the fiber-optic waveguide.

4. The arrangement as claimed in claim 2, wherein the first electrically conductive connection is more brittle than the core region.

5. The arrangement as claimed in claim 2, wherein a second electrically conductive connection is additionally present and runs in or on the fiber-optic waveguide.

6. The arrangement as claimed in claim 5, wherein the second electrically conductive connection forms an electric circuit with the first electrically conductive connection, and
    the arrangement further comprises means for checking the functionality of said first electrically conductive connection which detects a current flowing in the electric circuit.

7. The arrangement as claimed in claim 5, wherein the second electrically conductive connection runs at a distance from the first electrically conductive connection, and
    the arrangement further comprises means for checking the functionality of said first electrically conductive connection which detects a voltage present between the first and second electrical connections.

8. A light-emitting device comprising the arrangement as claimed in claim 1, and
    a radiation source present at the first end of the fiber-optic waveguide, which radiation source emits the radiation having the first wavelength.

9. The light-emitting device as claimed in claim 8, wherein the radiation source comprises a short-wave radiation source.

10. The arrangement as claimed in claim 1, wherein the fiber-optic waveguide comprises fibers containing a material selected from:
    glass and plastic.

11. The arrangement as claimed in claim 1, wherein a radiation source is present at the first end of the fiber-optic waveguide, and wherein the radiation source emits said radiation having the first wavelength and an optical component is present at the second end, wherein the optical component interacts with the converted light or with the radiation emerging from the fiber-optic waveguide.

12. The arrangement as claimed in claim 11, wherein the second end of the fiber-optic waveguide is connected to a transparent body in light-guiding fashion.

13. The arrangement as claimed in claim 8, wherein the arrangement emits light that is a mixture of light having the first wavelength and light having the second wavelength.

14. The arrangement as claimed in claim 1, wherein the converter material comprises nanoparticles.

* * * * *